United States Patent [19]
Lercher et al.

[11] Patent Number: 5,466,429
[45] Date of Patent: Nov. 14, 1995

[54] PROCESS FOR PREPARING ISOCYANIC ACID FROM CYANURIC ACID

[75] Inventors: Johannes Lercher, Vienna, Austria; Zhan Zhaoqui, Enschede, Netherlands

[73] Assignee: Chemie Linz GmbH, Linz, Austria

[21] Appl. No.: 302,321

[22] Filed: Sep. 8, 1994

[30] Foreign Application Priority Data

Sep. 9, 1993 [AT] Austria ................................ 1818/93

[51] Int. Cl.⁶ .................................................. C01C 3/14
[52] U.S. Cl. .......................... 423/365; 423/236; 544/192
[58] Field of Search ............................ 544/192; 423/365, 423/236

[56] References Cited

U.S. PATENT DOCUMENTS 5,091,553  2/1992  Müllner et al. ........................ 558/302

FOREIGN PATENT DOCUMENTS 3928556  6/1991  Germany .

92/04968  4/1992  WIPO .

OTHER PUBLICATIONS

N. Kriebitzsch et al., Cyanuric Acid and Cyanuric Chloride, Verlag, Chemie GmbH, Weinheim, 1971, pp. 191–200.
Gmelins Handbuch der Anorganischen Chemie, Verlag, Chemie GmbH, Weinheim, 1971, pp. 327–328.
Chemical Abstracts, vol. 94, col. 15225s (1981).
Chemical Abstracts, vol. 119, col. 141578g (1993).
Chemical Abstracts, vol. 112, col. 164179x (1990).
Chemical Abstracts, vol. 100, col. 85217g (1984).
Chemical Abstracts, vol. 73, col. 44687r (1970).
Derwent Abstracts, Ref. 92–062869/08 (1989).

*Primary Examiner*—Shailendra Kumar
*Attorney, Agent, or Firm*—Wenderoth, Lind & Ponack

[57] ABSTRACT

Process for preparing isocyanic acid by bringing cyanuric acid into contact with an aluminum catalyst at temperatures of from 300° to 600° C. and isolating the isocyanic acid formed or directly using it for further reaction.

8 Claims, No Drawings

PROCESS FOR PREPARING ISOCYANIC ACID FROM CYANURIC ACID

Monatshefte für Chemie 101, 866–870 (1970) discloses that, on heating to about 400° C., cyanuric acid first goes into the gaseous state, after which a thermal equilibrium with isocyanic acid is established.

WO 92/4968 describes that gaseous cyanuric acid can be catalytically decomposed at temperatures of from about 400° to 520° C. to give a mixture of products which are not more closely defined and are capable of reducing oxides of nitrogen in a gas stream. The catalysts specified here are catalysts containing zirconium and/or phosphorus.

It has now unexpectedly been found that the catalytic thermal decomposition of cyanuric acid results in not a mixture of products, but virtually exclusively isocyanic acid, if the catalyst used is an aluminum catalyst.

The invention accordingly provides a process for preparing isocyanic acid, which is characterized in that cyanuric acid is brought into contact at temperatures of from 300° to 600° C. with an aluminum catalyst, after which the isocyanic acid formed is isolated or used directly for further reaction.

The preparation of cyanuric acid can be carried out, for example, as described in U.S. Pat. No. 4,278,794 from crude or waste melamine.

For the purposes of the present invention, an aluminum catalyst is a catalyst which contains an aluminum compound such as aluminum oxide, AlOOH, aluminosilicate or spinels as active constituent. In addition, the catalyst can also contain other metals, such as silver, copper, iron, cobalt, nickel, titanium, manganese, chromium or mixtures thereof, preferably in the form of their oxides. Particular preference is here given to a catalyst which consists of aluminum oxide or contains aluminum oxide. The catalyst can be used in a customary form, for example in the form of tablets, pellets, particles, spheres, rings, or as such applied on an inert support such as, for instance, silicon, aluminum, aluminum silicate, ceramic oxides, alumina or alumina hydrates, or zinc oxide. The support can also be a monolithic support made of ceramic, steel or glass on which the active catalyst is fixed. The aluminum catalyst is preferably used as such.

If an inert support is used, the catalyst should contain from about 0.1 to 50% by weight of catalytically active aluminum. Such catalysts are known and are commercially available.

The optimum amount of catalyst which is decisive not for the reaction itself, but solely for the reaction rate, essentially depends on the volume flow of the reaction gas and thus on the reaction arrangement. For each reaction arrangement, it can easily be determined by preliminary experiments using various ratios of amounts. It has been found in experiments that a weight ratio of cyanuric acid-:aluminum of about 50:1, preferably of from 20:1 to 5:1 to about 1:50, gives good results in respect of the reaction rate. Since the catalyst remains highly active over long periods of time, smaller amounts of catalyst can also be used, with a longer contact time possibly being accepted.

To carry out the process of the invention, solid cyanuric acid can be mixed with the catalyst, heated to the reaction temperature and the gas formed can be drawn off, if desired with the aid of a carrier gas which is inert under the reaction conditions. Since cyanuric acid sublimes at temperatures of about 300° C., the cyanuric acid can also be converted into the gaseous state by heating and the gas, if desired with the aid of a carrier gas which is inert under the reaction conditions, can be passed over the catalyst at reaction temperatures. A further possibility is the use of a fluidized-bed reactor which is initially charged with catalyst particles and a fluidized bed is built up by blowing in a carrier gas which is inert under the reaction conditions. Cyanuric acid is introduced in solid or in gaseous form into this fluidized bed and the reaction gas, which contains the isocyanic acid, is drawn off.

The reaction temperature is here from 300° to 600° C., preferably from 320° to 450° C. Suitable carrier gases which are inert under the reaction conditions are, for instance, helium, argon, nitrogen and air.

On contact with the aluminum catalyst, the cyanuric acid is virtually completely converted into isocyanic acid. It has been found here that the catalyst remains active over long periods of time.

To isolate the isocyanic acid, the gas stream leaving the reaction vessel can, for example, be passed through a cold trap or into a cooled diluent, for example an ether, where the isocyanic acid condenses so that ready-to-use isocyanic acid or isocyanic acid solutions are formed. According to EP-A-0 416 236, it is advantageous to also add a gaseous ether or a gaseous tertiary amine to the gas stream, or the gas stream is passed into a liquid tertiary amine or into an ether, with an adduct of isocyanic acid and ether or of isocyanic acid and tertiary amine being formed so that the isocyanic acid is stabilized. The adduct formed in the gas phase is then condensed in an inert liquid diluent, as described in EP 416 236. The adduct of isocyanic acid and tertiary amine reacts, according to EP-A-0 410 169, like the free isocyanic acid itself and can be converted into corresponding downstream products in the same way as the free isocyanic acid.

The gaseous isocyanic acid formed can, however, also be reacted directly with another compound, for example, as described in EP-A-0 410 168, with a primary or secondary amine to form unsymmetrically substituted ureas.

The process can be carried out continuously or batchwise and is preferably carried out continuously.

In a preferred embodiment, a fluidized-bed reactor is initially charged with aluminum oxide. A fluidized bed is built up by blowing in nitrogen, and is heated to from 350° to 450° C. Solid or gaseous cyanuric acid is continuously introduced into this fluidized bed and at the same time reaction gases are continuously discharged with the aid of nitrogen.

The isocyanic acid formed is, if desired after mixing with a gaseous tertiary amine, condensed into an inert diluent as described in EP-A-0 416 236.

Isocyanic acid is obtained in good yields from cyanuric acid in the way described. The process therefore constitutes an advance in the art.

EXAMPLE 1

35 g of aluminum oxide were introduced into a fluidized-bed reactor. A fluidized bed was built up with the aid of nitrogen. Over a period of 40 minutes and at a temperature of 380° C., 58 g of cyanuric acid were introduced into the fluidized bed. The reaction gases formed, which contained only isocyanic acid and nitrogen (measurement by mass spectroscopy), were subsequently passed through two cold traps cooled by liquid nitrogen. The solid frozen out was taken up in chloroform and warmed to room temperature, with the solid dissolving. The first cold trap was found to contain 40% of the theoretical yield of isocyanic acid and the second was found to contain 30% of the theoretical yield.

To determine the content, a measured amount of the solution containing the isocyanic acid was admixed with a known amount of aqueous sodium hydroxide solution of known concentration and stirred for from 15 to 30 minutes. The unconsumed sodium hydroxide solution was back titrated with hydrochloric acid against phenolphthalein.

Comparative Example

A fluidized-bed reactor was initially charged with 100 g of quartz sand, and a fluidized bed was built up using nitrogen and heated to 380° C. Over a period of 60 minutes, 87 g of cyanuric acid were introduced into this fluidized bed. The reaction gases were passed through 2 cold traps, cooled by liquid nitrogen. The solid frozen out was taken up in chloroform, but it did not dissolve. No isocyanic acid could be detected in the chloroform solution. The solid was identified as cyanuric acid by means of an IR spectrum.

What we claim is:

1. Process for preparing isocyanic acid, wherein cyanuric acid is brought into contact at temperatures of from 300° to 600° C. with an aluminum catalyst, after which the isocyanic acid formed is isolated or used directly for further reaction.

2. Process according to claim 1, wherein the aluminum catalyst used is a catalyst containing aluminum oxide as active component.

3. Process according to claim 1, wherein the aluminum catalyst used is aluminum oxide.

4. Process according to claim 1, wherein the aluminum catalyst is used without a support.

5. Process according to claim 1, wherein solid cyanuric acid is mixed with the aluminum catalyst and is heated to temperatures of from 300° to 600° C.

6. Process according to claim 1, wherein gaseous cyanuric acid, with or without a carrier gas which is inert under the reaction conditions, is passed over the aluminum catalyst.

7. Process according to claim 1, wherein a fluidized-bed reactor is initially charged with aluminum catalyst particles and a fluidized bed is built up by blowing in a carrier gas which is inert under the reaction conditions, into which bed the solid or gaseous cyanuric acid is introduced.

8. Process according to claim 1, wherein the reaction is carried out at temperatures of from 320° to 450° C.

\* \* \* \* \*